United States Patent [19]

Geske

[11] 4,096,911

[45] Jun. 27, 1978

[54] CHANNEL BASE WELL SCREEN

[75] Inventor: Bruce R. Geske, Fridley, Minn.

[73] Assignee: UOP Inc., Des Plaines, Ill.

[21] Appl. No.: 813,047

[22] Filed: Jul. 5, 1977

[51] Int. Cl.² ............................................. E21B 43/08
[52] U.S. Cl. ..................................................... 166/234
[58] Field of Search ................ 166/231, 232, 233, 234

[56] References Cited

U.S. PATENT DOCUMENTS

| | | | |
|---|---|---|---|
| 725,117 | 4/1903 | Morris | 166/231 |
| 2,046,459 | 7/1936 | Johnson | 166/233 |
| 2,323,713 | 7/1943 | Harmon | 166/231 |
| 2,811,882 | 11/1957 | Hess | 166/232 |

*Primary Examiner*—James A. Leppink
*Attorney, Agent, or Firm*—James R. Hoatson, Jr.; Barry L. Clark; William H. Page, II

[57] ABSTRACT

Well screen having a base made of formed channels provides the strength of a pipe base screen but weighs less, costs less, and provides greater vertical flow area. The channels are perforated and are in continuous contact around the screen with the contiguous legs of adjacent channels being welded at their ends to each other and to the wrap wire. The screen is particularly useful in oil and gas wells where great torsional strength is needed.

8 Claims, 11 Drawing Figures

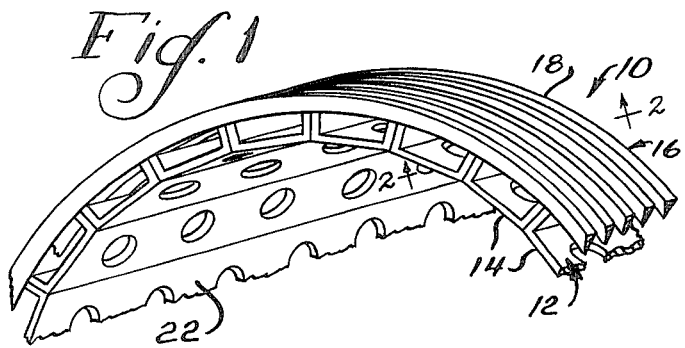
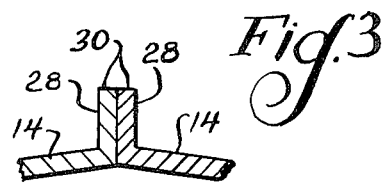
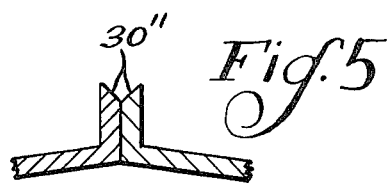
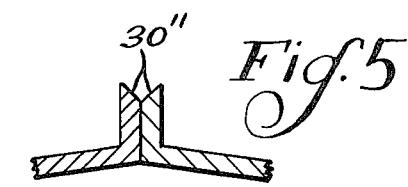
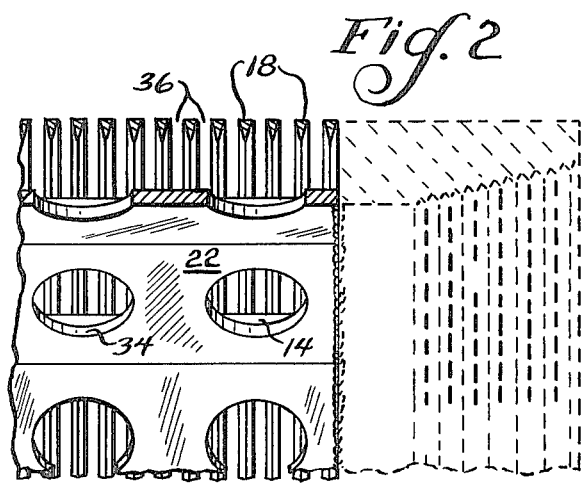
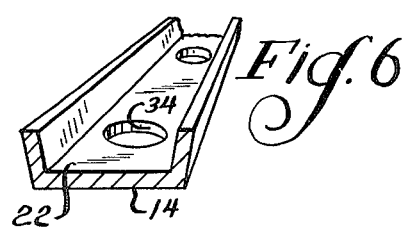
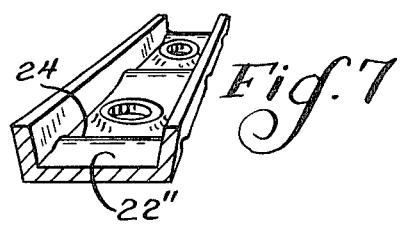
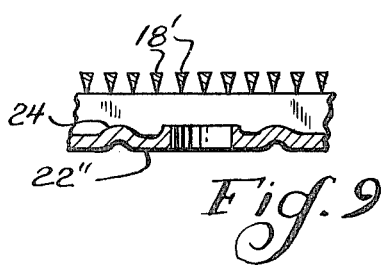
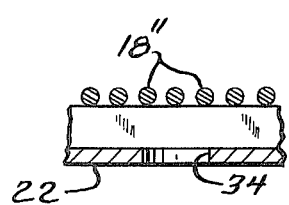
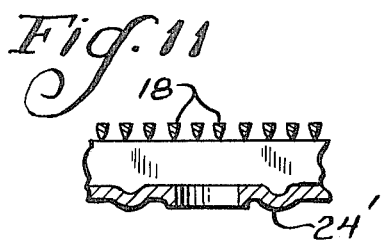

CHANNEL BASE WELL SCREEN

BACKGROUND OF THE INVENTION

The invention relates to well screens, and particularly to screens of the type used to restrain sand, gravel or other particulate matter from entering oil and gas wells. Most such screens are made by the spiral wrap process, in which a continuous wire is helically wound about an internal cylindrical supporting structure. Each turn of the wire is separated from the preceding turn by a gap, or "slot" whose width determines the size of the particles restrained.

In spiral wrapped metal screens of the type disclosed in Johnson U.S. Pat. No. 2,046,058, the inner structure is a plurality of rods having their axes in parallel alignment and radially disposed and attached to the inner surfaces of the enwrapment. The enwrapping wire and the slot adjacent thereto are both continuous. The inner rods offer little or no obstruction to inward flow, thus maintaining high slot efficiency. The spiral wrap process has proven to be the most efficient system of fine slot generation.

Although screens of the type disclosed in the aforementioned Johnson patent are quite adequate for water wells, they are not always satisfactory for oil and gas wells and particularly those of very great depth. In the production of oil and gas it is sometimes necessary to remove a well screen from the bottom of a well after a gravel pack has been placed surrounding the screen. Before the screen can be removed, it is necessary to remove the gravel pack and this is commonly done by inserting a generally tubular "wash-over" tool into the well in surrounding relation to the screen and intermediate the screen and the casing. Water injected on one side of the "wash-over" tool forms somewhat of a slurry with the gravel which is forced up the other side of the tool and removed. Sometimes as the "wash-over" tool is moved down past a screen, it engages one or more of the centralizing elements which are usually placed on the screen when it is assembled into the well in order to maintain it centered in the casing. Where an aluminum centralizer, such as the one disclosed in Fortenberry U.S. Pat. No. 3,981,359 is used, little problem is caused since the "wash-over" tool will merely cut its way through the soft aluminum. However, where certain other devices, such as those incorporating springs made of high carbon steel, are used, the hardness of portions of the centralizer can occasionally cause the rotating "wash-over" tool to become locked to the centralizer and thus to the well screen with the result that a sudden and very large torsional force is applied to the well screen. Where the well screen is of the type having a perforated pipe base, it is quite resistant to torsional bending. Generally, when such a screen is twisted by a "wash-over" tool, the twisting will cause the threads to be broken which connect the affected screen section to the element below it. Such a situation causes no particular problem since it is relatively easy to withdraw the portions of pipe and screen above the break and make a new attachment of a "fishing" tool to the screen or pipe portions below the break. However, where a screen is utilized which has a rod-type support rather than a pipe base support, there is less resistance to torsional forces and the rods often tend to look like spaghetti as they twist and break loose from the enwrapment, making reattachment of a "fishing" tool very difficult.

In the manufacture of plastic well screens for water wells, a screen having a corrugated or fluted base is disclosed in Patent Application Ser. No. 748,809 filed Dec. 8, 1976 and assigned to a common assignee. The disclosed base is either extruded in generally cylindrical form or is vacuum formed and then joined along its free edges. The design would be of insufficient strength for use in oil wells but does show an alternative type of support which would be stronger than longitudinal plastic rods.

SUMMARY

It is among the objects of the present invention to disclose a novel well screen which retains most of the functional efficiency of the original Johnson welded metal screen, provides the strength of perforated pipe base screens, but weighs less and costs less than the latter.

The improved screen is somewhat similar to conventional screens in that the wrap wire is welded at a myriad of points to a series of longitudinal members. However, rather than use longitudinal heavy gauge rods, the invention contemplates the use of relatively light gauge formed channel members which are in continuous contact in a ring-like manner around the screen and have radially outwardly diverging leg portions which are resistance welded at their tips to the enwrapment wire. The welds not only join the wires to the channels but they join adjacent channels to each other. The depth of the channels and the fact that they contact each other along their contiguous legs produces a screen which has a substantial resistance to torsional loading. The channels also provide great resistance to external pressures. The amount of resistance to external pressures can be enhanced by curving the web connecting the legs so that the web surfaces define a portion of a cylinder. Even greater resistance can be obtained by deforming the web surface to produce ribs on one side of the web and grooves on the other.

The improved channel base well screen also provides greater internal vertical flow capability than a pipe base screen of equal strength since the wall thickness is much less. For example, a pipe base well screen utilizing a four inch internal pipe would have a wall thickness equal to the approximately 0.25 inch thickness of the pipe plus the thickness of the screen jacket which consists of the wrap wire and the underlying longitudinal rods. Since the channel base design eliminates the necessity for longitudinal rods, the space taken up by their thickness is saved. Representative dimensions for the channel members might be 0.060–0.070 inch thickness, 0.750 inch web width and 0.187–0.250 inch leg depth. Because of the strength of the channels, it would also be possible to use lighter gauge wrap wire than used on a conventional screen having a rod base. The use of narrow wires would not only reduce the cost and weight of a screen but would also provide a much greater open area for flow since adjacent slots would be positioned closer together.

The channels can be formed quite easily, including the piercing of the holes, in a progressive press operation. In making the screen, the pre-formed channels would be placed over a mandrel in a winding machine in much the same manner as the rods are placed when making conventional screens. The ring-like or cylindrical array of channels would then be rotated and axially advanced as the wrap wire is brought into contact with its periphery and welded to the tips of the channel legs.

The material used would depend on the end use but could be any material commonly used for screens such as stainless steel or various metal alloys. Plastic materials could also be used where great strengths are not required.

BRIEF DESCRIPTION OF THE DRAWINGS

FIG. 1 is a perspective fragmentary view of a length of well screen made in accordance with the invention;

FIG. 2 is a sectional view made on line 2—2 of FIG. 1 with a threaded end connector indicated in phantom;

FIGS. 3, 4 and 5 show various modified shapes for the ends of the channel legs;

FIGS. 6, 7 and 8 show various modified shapes for the channel webs; and

FIGS. 9, 10 and 11 are similar to a portion of FIG. 2 but show various wire cross-sections and web cross-sections which might be utilized.

DESCRIPTION OF THE PREFERRED EMBODIMENT

Referring to FIG. 1, the improved well screen is indicated generally at 10 and can be seen to comprise a ring 12 of individual channel members 14 covered by an external enwrapment surface 16 formed by spirally winding one or more formed wires 18. Although the web portions 22 of the channels 14 are shown in FIGS. 1 and 6 as being flat so as to provide an internal polygonal configuration, the web portions could also be curved as shown at 22' in FIG. 8. The curved surface 22' would offer a greater torsional rigidity to the screen 10 than the flat configuration 22 shown in FIG. 6. The configuration shown in FIG. 7 wherein the web 22" has ribs 24 formed in it offers even greater strength than the embodiments shown in FIGS. 6 and 8.

Referring to FIGS. 3–5, fragmentary cross-sections of a pair of adjacent channel members 14 are shown. In FIG. 3, the legs 28 of the channels are shown as having flat tip portions 30. In FIG. 4, the leg tip portions 30' are shown as being angled to meet in a common point whereas in FIG. 5, the end portions 30" are shown as being angled to provide spaced points. Whether or not the leg 28 is provided with the tip 30, 30' or 30" is a matter of choice dependent somewhat on the type of weld desired. Probably, the FIG. 4 configuration would provide the strongest weld since the point made by the angled tip surfaces 30' would concentrate the welding heat and thus be able to penetrate the weld wire 18 to a greater extent than the configurations shown in FIGS. 3 and 5.

FIGS. 9, 10 and 11 illustrate three different wire cross-sections 18, 18' and 18" which could be utilized depending upon the purpose of the screen and the shape of the particulate material with which the screen is to be used. The round shape 18" is probably easier to form but the tapered shapes 18, 18' are non-clogging shapes which are especially easy to weld because of their sharp lower end surfaces.

FIGS. 9 and 10 also illustrate cross-sections of the channel webs 22, 22" shown in FIGS. 6 and 7. FIG. 11 is similar to FIG. 9 except that the ribs 24' face inwardly instead of outwardly.

The channel members 14 are preferably provided with a series of holes 34 which should preferably have a total area at least equal to the open area of the slots 36 formed between adjacent turns of the wire 18.

Although the screen 10 is of particular value when formed of stainless steel or other strong, corrosion-resistant material and used for oil or gas wells, it can also be made of other materials and for other uses. For example, when formed of plastics it would provide improved results over existing rod and wire type screens or pipe base screens for use in water well or other areas less demanding than oil wells.

The channels may also be prewelded together or welded in addition to the enwrapment wire welds. Such additional welding would allow alternative wire enwrapment methods or may be desirable for additional strength.

I claim as my invention:

1. A well screen comprising a hollow, multiple channel core portion and a formed wire enwrapment portion defining open slots for the passage of liquid or gas; said core portion comprising a continuous ring of longitudinal channel members, each of said channel members having a relatively wide web portion and relatively short leg portions extending radially outwardly from said web portion, said web portions being perforated and said leg portions being welded to said formed wire enwrapment at each juncture therewith.

2. A well screen in accordance with claim 1 wherein said web portions of said channel members have a cross-section taken in a plane normal to the axis of the screen which is cylindrical.

3. A well screen in accordance with claim 1 wherein said web portions of said channel members have transverse rib portions formed at spaced positions along their length.

4. A well screen in accordance with claim 1 wherein said leg portions have terminal edges which are formed at a non-perpendicular angle to the plane of the legs.

5. A well screen in accordance with claim 4 wherein said edges are formed such that the terminal edge of each of the contiguous legs of adjacent channel members forms an acute angle with the outer surface of the leg.

6. A well screen in accordance with claim 4 wherein said edges are formed such that the terminal edge of each of the contiguous legs of adjacent channel members forms an obtuse angle with the outer surface of the leg.

7. A well screen in accordance with claim 1 wherein said well screen is metal.

8. A well screen in accordance with claim 1 wherein said well screen is plastic.

* * * * *